United States Patent [19]

Kuromi

[11] Patent Number: 5,233,646
[45] Date of Patent: Aug. 3, 1993

[54] TELEPHONE-OPERATED STEREO SHUT-OFF DEVICE

[76] Inventor: Kevin H. Kuromi, 17008 Komori Cir., Gardena, Calif. 90247

[21] Appl. No.: 705,518

[22] Filed: May 24, 1991

Related U.S. Application Data

[63] Continuation-in-part of Ser. No. 405,446, Sep. 11, 1989, abandoned.

[51] Int. Cl.⁵ .......................................... H04M 11/00
[52] U.S. Cl. .................... 379/102; 379/110; 340/310 R
[58] Field of Search ............... 379/373, 375, 377, 378, 379/110, 66, 102, 104, 105, 395, 387, 58; 455/355; 381/105; 340/310 A, 310 R

[56] References Cited

U.S. PATENT DOCUMENTS

| | | | |
|---|---|---|---|
| 4,058,678 | 11/1977 | Dunn et al. | 379/66 |
| 4,243,973 | 1/1981 | Sandidge | 379/102 |
| 4,389,543 | 6/1983 | Granirer et al. | 379/378 |
| 4,425,477 | 1/1984 | Magil | 379/110 |
| 4,805,206 | 2/1989 | Beom-Chae | 379/110 |
| 4,873,712 | 10/1989 | Porco | 379/58 |
| 5,051,720 | 9/1991 | Kittirutsunetorn | 340/310 A |

FOREIGN PATENT DOCUMENTS

| | | | |
|---|---|---|---|
| 55-135407 | 10/1980 | Japan | 379/102 |
| 62-147855 | 7/1987 | Japan | 379/102 |

Primary Examiner—James L. Dwyer
Assistant Examiner—Wing F. Chan
Attorney, Agent, or Firm—Cislo & Thomas

[57] ABSTRACT

A telephone-operated stereo shut-off device for a stereo comprising a sensing component operatively associated with a telephone to sense an increase or decrease in voltage when the telephone rings, is answered or hung up. The device consists of a signal transmitting component that transmits a signal indicating the increase or decrease in voltage when electronically activated by the sensing component; a signal receiving component for receiving the signal transmitted by the radio transmitting component; and a switching component for opening and closing a speaker muting circuit located between a speaker and the stereo. The switching component is activated by the signal receiving component, wherein the speaker of the stereo is muted when an incoming telephone call is answered and conversely the speaker resumes operation after the telephone is hung up.

11 Claims, 9 Drawing Sheets

TELEPHONE-OPERATED STEREO SHUT-OFF DEVICE

CROSS REFERENCE TO RELATED APPLICATION

This application is a continuation-in-part of application Ser. No. 07/405,446 filed Sep. 11, 1989 now abandoned.

TECHNICAL FIELD

This invention relates generally to control devices, and more particularly, to control devices for automatically muting the broadcast of a conventional stereo system when the telephone is answered without the need of external interconnecting cables or wiring.

BACKGROUND ART

Various electronic circuitry and gadgets exist for the control of various household appliances including telephones and radios. Such devices require interconnecting cables or wiring with which to turn down or turn off a conventional radio when the listener wishes to focus on other matters such as a received telephone call. There are also a number of remote control devices made part of entertainment centers which allow the listener to selectively turn down or turn off a stereo by pushing a button on a hand-held control unit which is operatively associated with the stereo or entertainment system. Such devices make use of infrared and radio controlled remote control devices.

Even before the advent of wireless remote control devices, apparatus for turning on and off a radio upon the answering of a telephone have been tried. U.S. Pat. No. 1,916,131 issued to W. J. Becker on Jun. 5, 1934 discloses a mechanical arm 13 which operatively moves between two contacts 14 and 16 and must invade the mechanism which actuates the bell or telephone signaling device 2. This type of device is not modular or easily installed in association with standard telephones.

U.S. Pat. No. 2,140,655 issued to C. J. Sloan on Dec. 20, 1938 also discloses a device attempting to turn off a radio when a telephone call is received. A mercury switch must be fastened to the exterior of the telephone handset 1 and strapped in such a position so that when the handset is lifted, the mercury switch is opened preventing the playing of the radio since a circuit is open. Similarly, this device is taped or fastened to the exterior of the telephone. Therefore, there is a possibility that the circuit can be opened in the event the conversationalist using the telephone chooses a reclined position as opposed to a normal standing one.

U.S. Pat. No. 2,165,693 issued to T. D. Boss on Jul. 11, 1939 discloses a mechanical switch which must be positioned between a telephone base 5 and a handset 6. When the handset 6 is cradled with the telephone base 5, the switch is activated closing the circuit allowing the radio to play. When the handset is lifted, the switch is disengaged opening the circuit and preventing the radio from playing.

U.S. Pat. No. 2,212,792 issued to A. C. Reading on Aug. 27, 1940 discloses a mechanical switching device which is operatively associated with a handset of a telephone so that when the handset is lifted a lever 10 is actuated to prevent current from flowing to the radio while the handset is disengaged from the telephone.

U.S. Pat. No. 4,425,477 issued to Paul A. Magil on Jan. 10, 1984 discloses a hardwired telephone line triggered attenuator that automatically decreases the audio output of an audio system while a telephone is being used. When the handset is removed from its cradle, an electrical signal is produced that is detected by a sensor and control means. The detected signal is applied to a relay means from where the signal interacts with an attenuation means to effectuate a predetermined decrease in the audio output level of the audio system. The attenuator automatically restores the audio output to its previous level when the handset is returned to its normal position on the telephone cradle.

Japanese Patent No. 55-135407 issued to M. Tsurumi on Oct. 22, 1988 discloses a sound volume adjuster for a speaker that automatically lowers the audio level during a telephone conversation. The adjuster consists of a telephone, a radio frequency transmitter located inside or close to the telephone and a receiver connected to a radio or television speaker. When individuals are talking over the telephone, their conversation is received by the microphone, amplified and transmitted by a radio signal generated by the transmission section. The receiver receives the signal and a control connected to the receiver automatically reduces the sound volume generated by the speaker when the telephone handset is lifted. Thus, the sound does not interfere with the telephone conversation.

There is great potential interest in the electronics consumer market for a simple, wireless easily manufactured, non-intrusive electronic device which can mute a radio when the listener decides to pick up the telephone handset from the telephone base. Also, it is desirable that the radio be able to resume playing when the handset is cradled with the telephone base. All of this must be performed without direct wire connections so as not to interfere with the placement of the telephone and stereo system to be controlled. Furthermore, it is ideal if the necessary components be compact and completely adaptable to standard telephone connections and X10 technology or AM/FM arrangements conventionally found in the current market place for such goods.

The features identified above as being desired for a telephone operated stereo shut-off system are all provided by the present invention.

DISCLOSURE OF THE INVENTION

The telephone-operated stereo shut-off device allows the speakers of a stereo receiver to be muted when ever a telephone set rings or the handset is lifted from the telephone set cradle. Additionally, the device allows the stereo and speakers to automatically resume normal operation when the handset is returned to its cradle.

The device consists of two major elements a telephone/transmitter unit and a stereo/receiver unit. The two units are presented in two modes of operation: in the preferred embodiment the device functions with a signal transmitter and receiver that utilize X10 technology. This technology allows the internal utility power wiring of a dwelling or structure to be used as the communication media between the signal transmitter and signal receiver. In the second embodiment, the communicating media utilizes radio-frequency transmission. In either case no unsightly cables or hardwiring between units is required to operate the device.

In the preferred embodiment, the telephone/transmitter unit has the means for sensing an increase or decrease in voltage when the telephone set rings or when the telephone handset is lifted from the telephone set cradle. Upon either occurrence, a transmitter enabling signal is produced that enables a transmitting means which in the preferred embodiment consists of the X10 transmitter. The enabled transmitter than transmits a signal through the internal utility power lines to the stereo/receiver unit that is plugged into a 115 volt a-c power outlet located near the stereo receiver or stereo speakers.

The stereo/receiver unit includes a receiving means having an X10 receiver that receives the signal from the transmitter. The receiver unit produces a power signal that is applied to a speaker muting circuit located integral to the unit. When the speaker muting circuit is de-energized, that is no power signal is being transmitted, the stereo receiver operates normally with the speakers connected directly to the speakers via the receiver unit. However, when the speaker muting circuit is energized by the application of the power signal, a voltage divider network is placed between the stereo receiver and the speakers to cause the speakers to be muted when the telephone set is in use. When the telephone is hung up, the circuit automatically returns the stereo system to its normal operation.

In the second embodiment, the telephone/transmitter unit and stereo/receiver unit function in a similar matter as above described with the exception that the audio is muted only when the handset is lifted. The basic difference in the component compliment of the second embodiment is that a radio signal transmitting means and a radio signal receiving means are used in lieu of the X10 units.

In the presentation of the invention, the basic utility is found in its use to automatically mute the audio of a stereo receiver when a telephone is in use. However, the invention can also be used as an on/off activator for controlling an external device. Such an on/off activator device can be comprised of a voltage sensing means that senses a voltage between two predetermined points and then generates a first signal when the voltage sensed increases above 5 volts. The first signal is applied to and activates a transmitting means that is operatively associated with the voltage sensing means. The transmitting means then transmits a radio signal of a predetermined frequency over a predetermined range.

The radio signal is received by a receiving means which then generates a second signal that is applied to a switching means. The switching means is designed to open and close a circuit when the second signal is received.

The voltage sensing means and the transmitting means are housed within a first modular housing. The housing partially retains a telephone set receptacle and a telephone line receptacle that are operatively associated with the voltage sensing means.

The receiving means and the speaker muting circuit are housed within a second modular housing. The housing partially retains an input port and an output port is operatively associated with the switching means and receives and secures a first wire; the output port is operatively associated with the switching means and receives and secures a second wire, whereby the device is wired in series with the input port, the output port and its power supply. Thus the device can be either supplied with or denied power depending upon the voltage sensed between the input jack and the output jack.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred and a second embodiment. Both embodiments of the telephone operated stereo shut-off device 10 are designed to automatically mute a stereo system when the telephone is in use.

Figure 1:
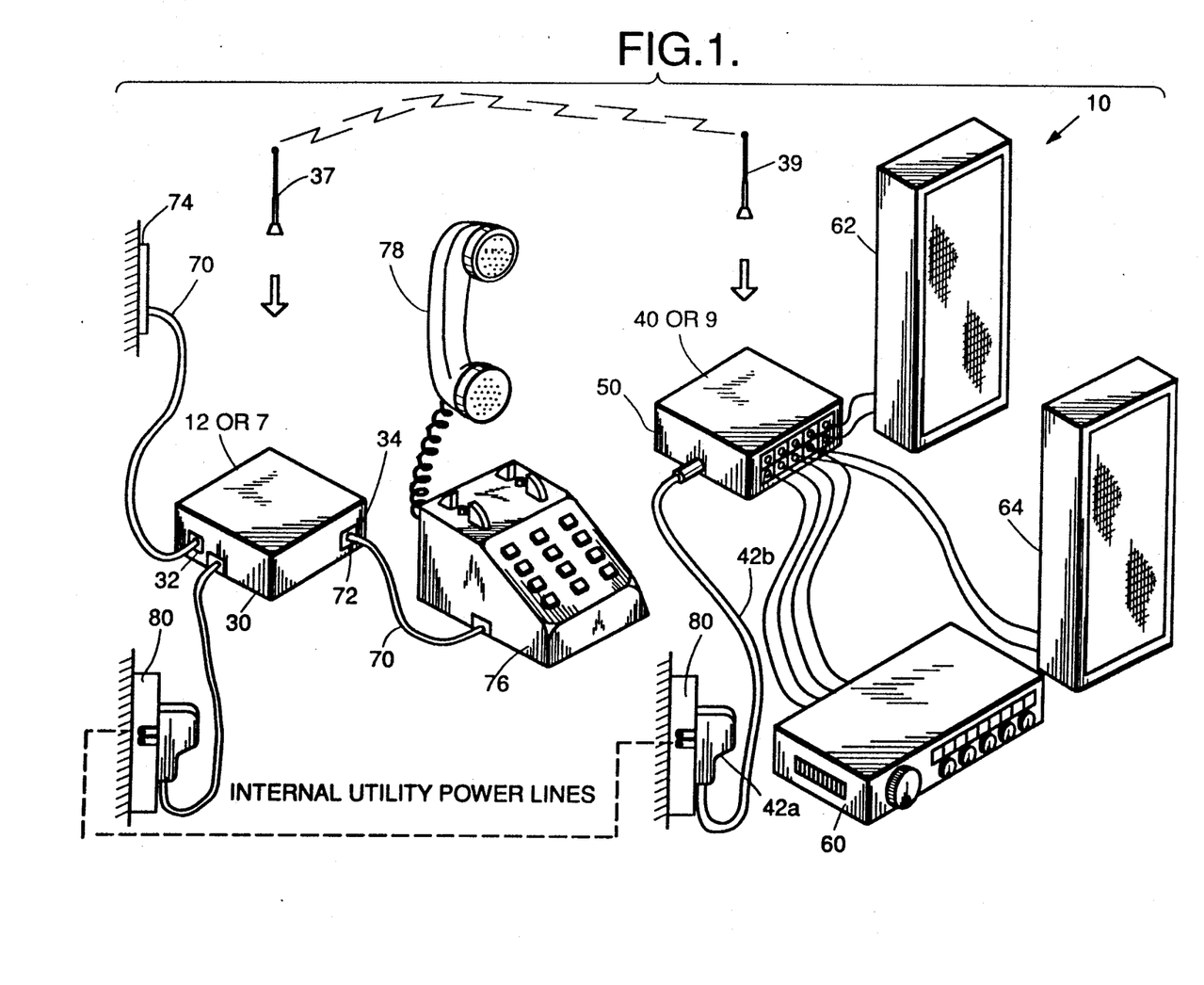
FIG. 1 is a perspective view of the overall telephone-operated stereo shut-off device illustrating both the preferred and second embodiments.

The preferred embodiment, as shown in FIGS. 1-5 is comprised of two major elements: a telephone/transmitter unit 12 and a stereo/receiver unit 40. These two units as shown in FIG. 1, function in combination with external elements consisting of a telephone set 76 and a stereo/receiver 60 that includes a pair of speakers 62, 64. The preferred communication media between the telephone/transmitter unit 12 and the stereo/receiver unit 40 is by means of the internal power lines located within a dwelling or other structure. This communication is achieved by incorporating in the transmitter unit 12 an X10 technology transmitter 20a that is connected to a first 115 volt a-c utility power receptacle 80; and an X10 receiver 42c in the receiver unit 40, that is also connected to a second 115 volt a-c utility power receptacle 80. When the telephone set 76 begins to ring or the telephone handset 78 is lifted, a coded signal is transmitted by the X10 transmitter 20a that is received by the X10 receiver 42c via the internal power lines as shown by the dotted lines in FIG. 1. The only prerequisite to this media of communication is that the transmitter and receiver be operated from a common utility power line; that is, a power line that is derived from a common utility power transformer.

Figure 2:
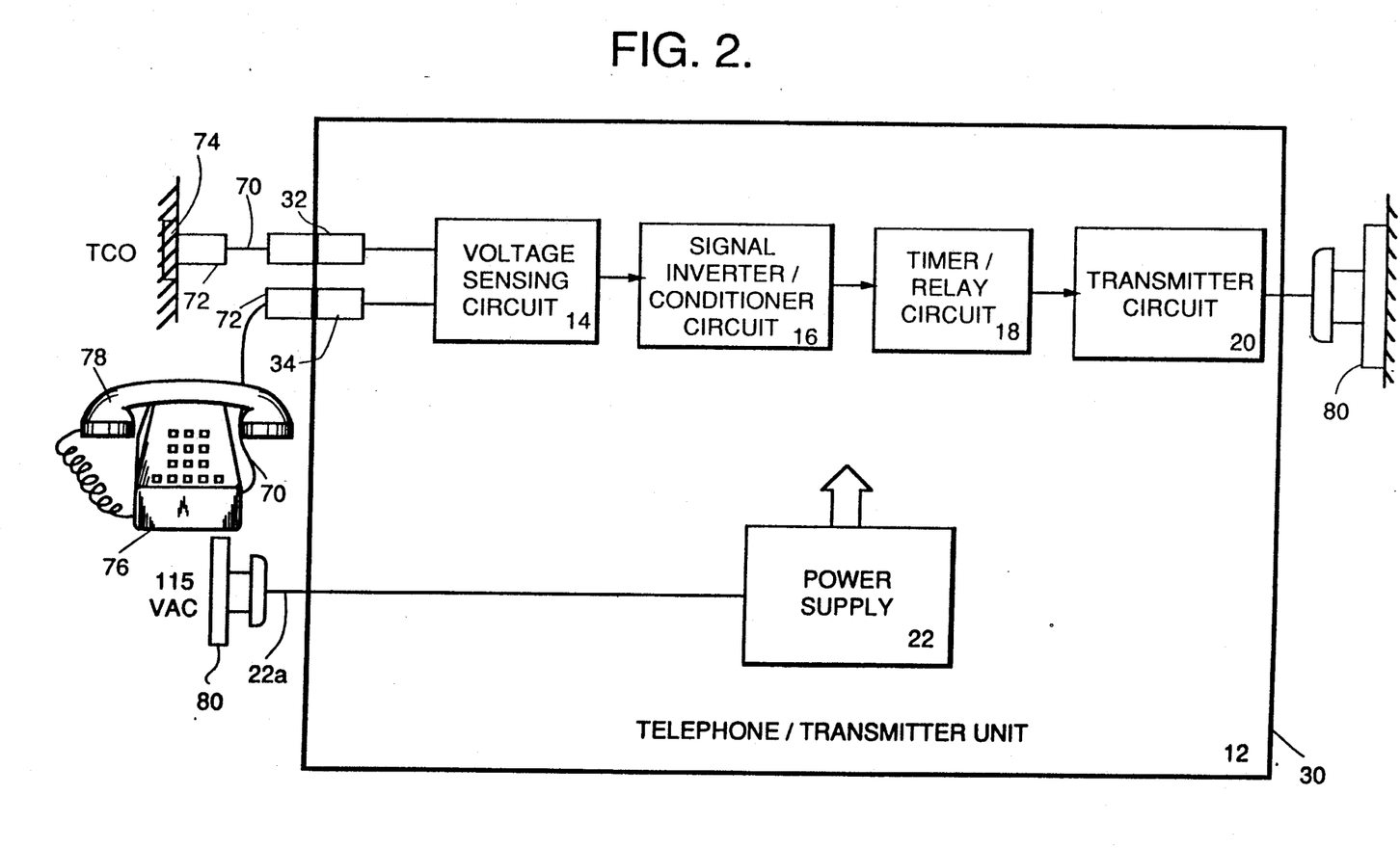
FIG. 2 is a block diagram illustrating the preferred embodiment of the telephone/transmitter unit.
Figure 4:
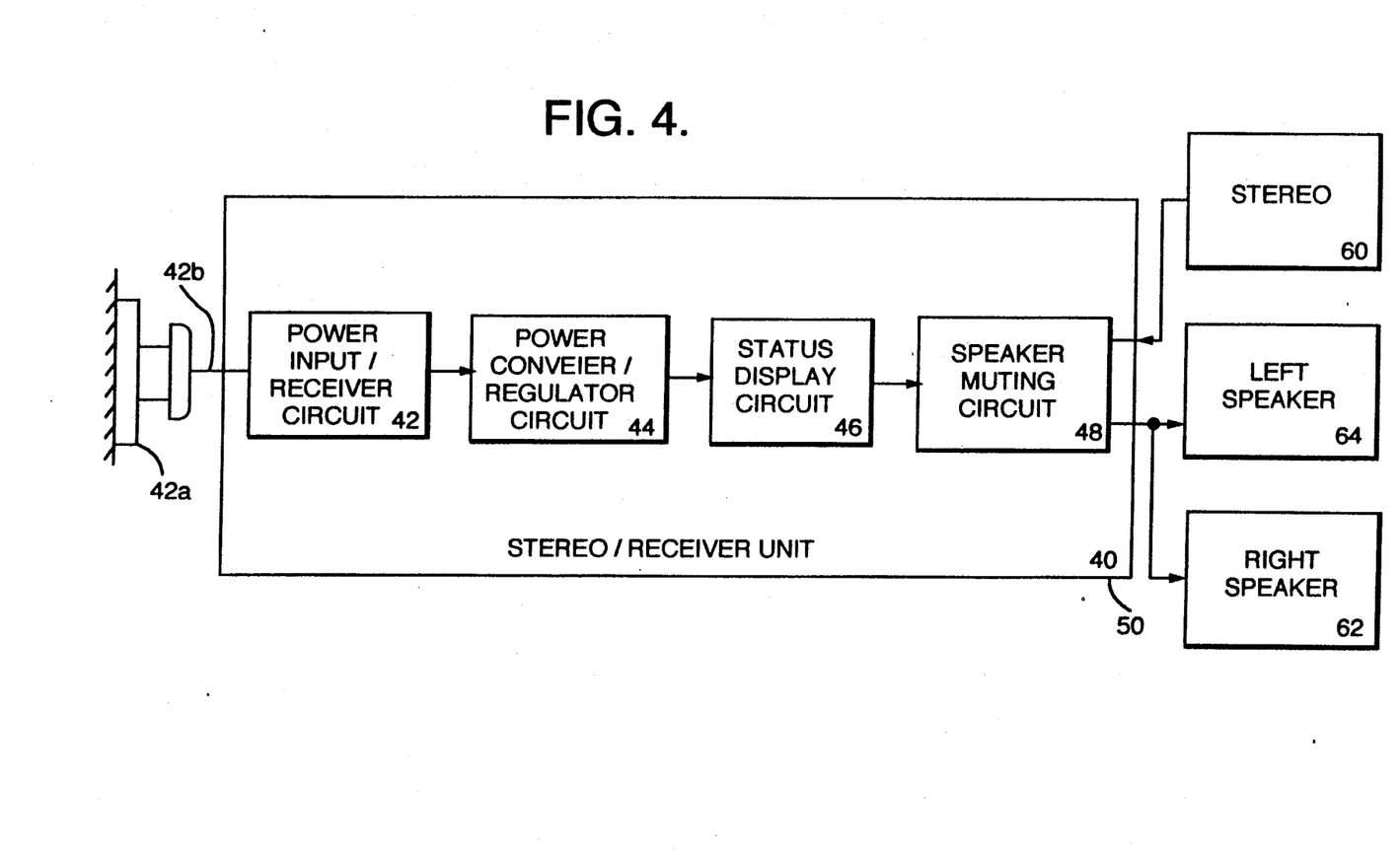
FIG. 4 is a block diagram illustrating the preferred embodiment of the stereo/receiver unit.

Before a detailed description of the telephone operated stereo muting device 10 is described an overview of the device as configured for the preferred embodiment is presented with reference to FIGS. 1, 2 and 4.

The telephone/transmitter unit 12 as shown in a block diagram in FIG. 2, consists of five major circuits; a voltage sensing circuit 14, a signal inverter/conditioner circuit 16, a timer/relay circuit 18, a transmitter circuit 20 and a power supply 22. All five circuits are housed within a portable enclosure 30 as shown in FIGS. 1 and 2.

The voltage sensing circuit 14 which is connected to the telephone central office (TCO) and to the telephone set 76, senses the power levels when the telephone set 76 rings or when the telephone handset 78 is lifted from the telephone cradle. Upon either occurrence, a first signal is produced that is applied to the signal inverter/conditioner circuit 16 where the first signal is inverted and placed in condition to produce a second signal that activates the timer relay circuit 18. The circuit 18 produces a timed signal when the telephone set 76 is ringing or lifted off-hook. The timed signal is applied to the coil of a relay such that when the relay is energized its contacts close to produce a transmitter enabling signal that enables the X10 transmitter 20a. The transmitter then sends a coded signal through the first utility power receptacle that is received, via the internal wiring, by the X10 receiver located in the stereo/receiver unit 40, that is also connected to the second utility power receptacle. The internal power supply 22 is designed to provide the required power levels to operate the circuits of the telephone/transmitter unit 12.

The stero/receiver unit 40 as shown in a block diagram in FIG. 4, consists of four major circuits; a power input/receiver circuit 42, a power converter/regulator circuit 44, a status display circuit 46 and a speaker muting circuit 48. All four circuits are housed within a portable enclosure 50 as shown in FIGS. 1 and 4.

The power input/receiver circuit 42 includes the X10 receiver 42a which is enabled when it receives the coded signal from the X10 transmitter 20a via the internal utility power lines. The enabled receiver which is connected to the second 115 volt a-c power receptacle 80, produces an a-c power signal that is applied to the power converter/regulator circuit 44 where the a-c power is converted to a constant 5 volts d-c. The d-c power is then used to power the status display circuit 46 that indicates when the device 10 is either receiving an incoming call or the telephone handset 78 has been lifted from the telephone set cradle. When the X10 receiver 42c is energized the power signal is also applied to a relay in the speaker muting circuit 48 that is connected between the stereo receiver and the speakers. When the relay is energized a voltage divider circuit is applied across the speakers 62, 64 that causes them to become muted and allow a telephone conversation to be conducted in a quiet environment.

In the discussions that follow, each of the circuits in the telephone/transmitter circuit 12 and the stereo/receiver unit 40 are described in detail with reference to FIGS. 3A, 3B and 5A, 5B respectively.

TELEPHONE/TRANSMITTER UNIT 12

Figure 3A:
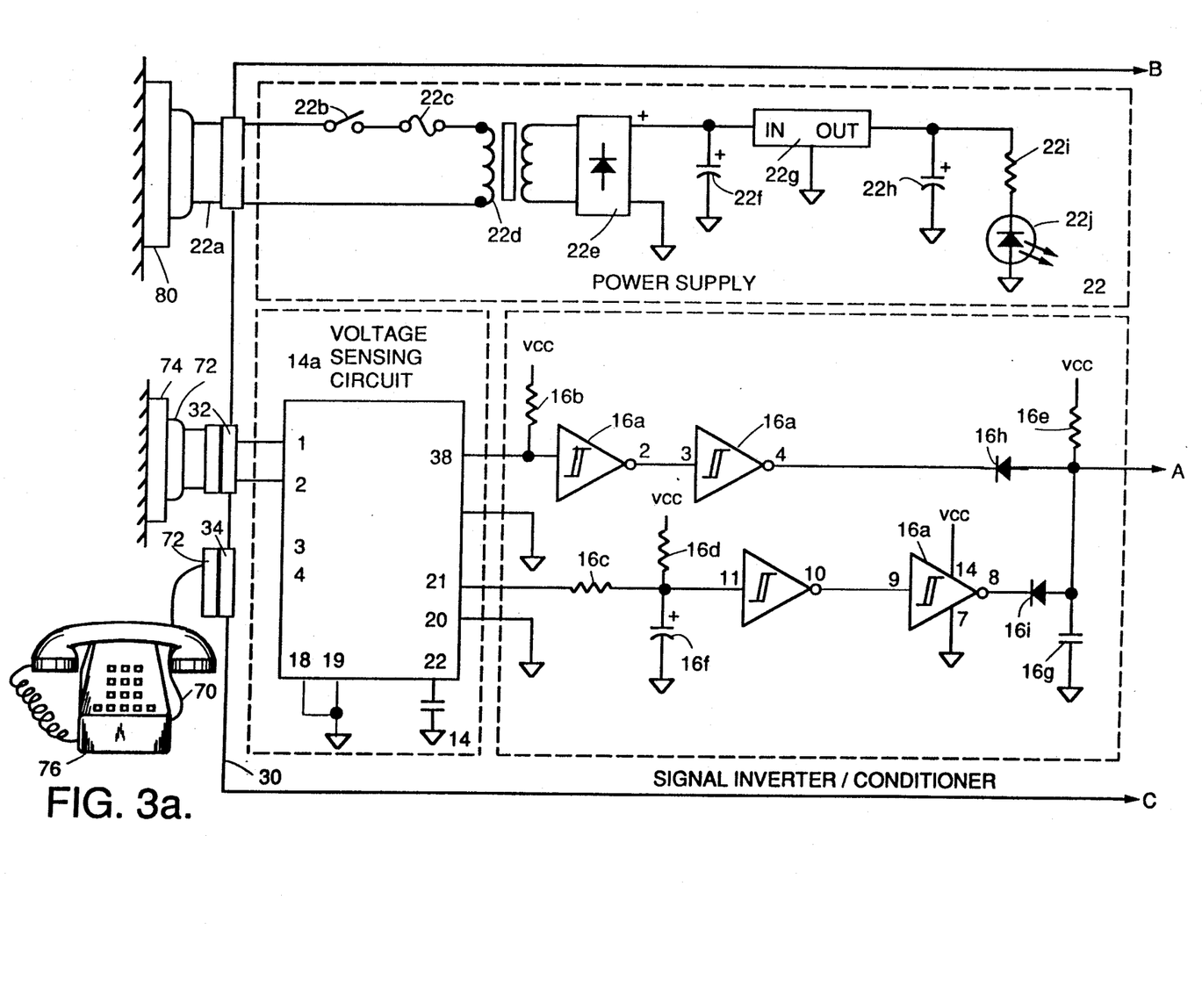
FIG. 3A is the first part of a schematic diagram illustrating the preferred embodiment of the telephone transmitter unit.
Figure 3B:
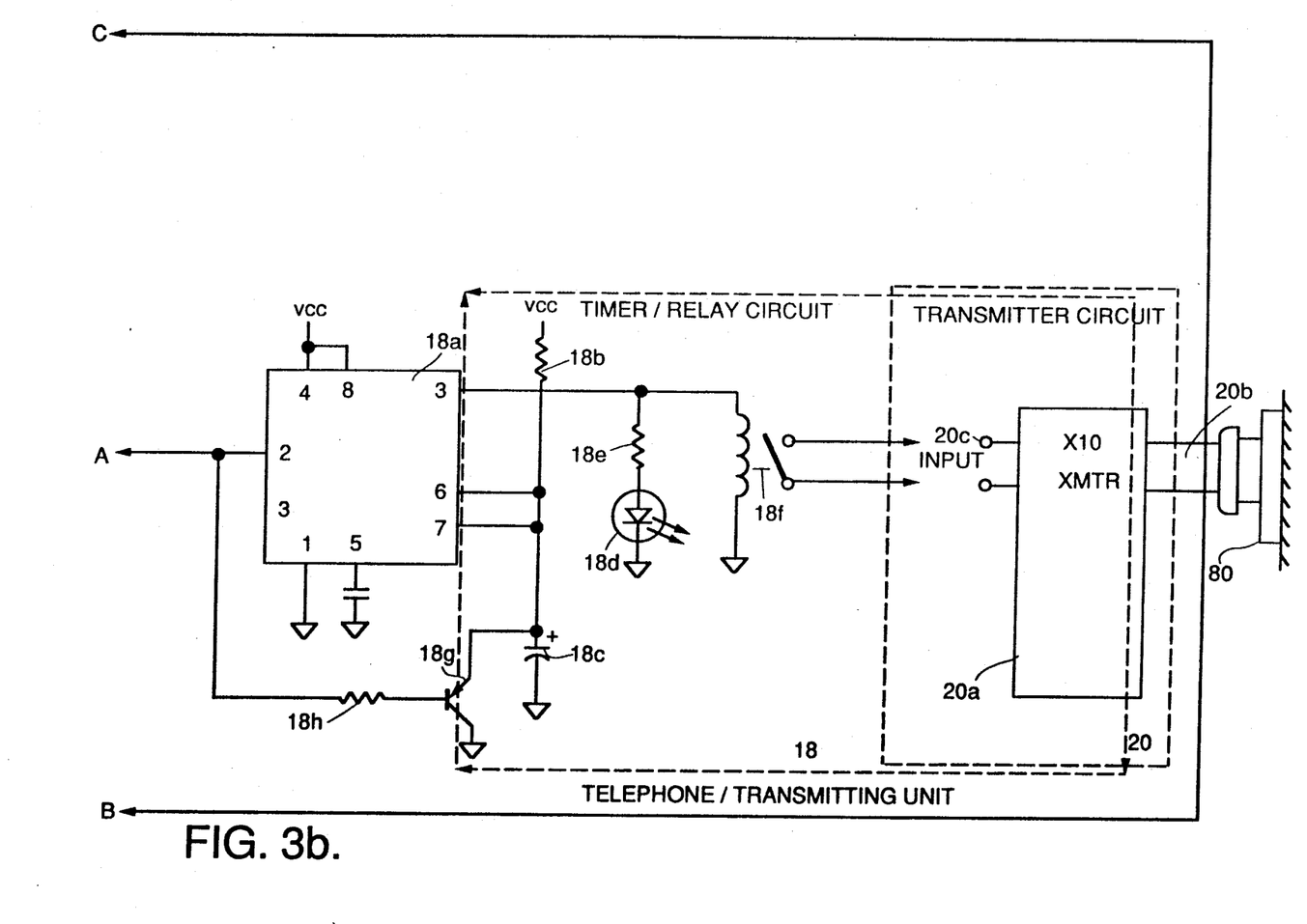
FIG. 3B is the second part of the schematic diagram illustrating the preferred embodiment of the telephone/transmitter unit.

The input to the telephone/transmitter unit 12, as shown in FIGS. 3A and 3B, commences at the ring/off-hook detector circuit 14a located in the voltage sensing circuit 14. The detector has two inputs: one is directly connected to the telephone central office (TCO) and the other to the telephone set 76. The connection to the TCO is made via a telephone cable 70 that has on each end an RJ11 plug 72. One of the plugs is plugged into the telephone wall receptacle 74 and the other to a mating telephone line receptacle 32 located on the telephone/transmitter unit enclosure 30. From the receptacle 32, the telephone line is connected to pin 1 (TIP0 and pin 2 (RING) of the ring off-hook detector 14a as shown in FIGS. 3A, 3B. The second input is connected to the telephone set 76 via a second telephone cable 70 that plugs into the telephone and a telephone set receptacle 34 also located on the enclosure 30.

The ring/off hook detector 14a, which preferably consists of a Cermetek CH 1813, is designed to sense the telephone "ring" voltage and the 40 ma current flow that is present when the telephone handset 78 is lifted from the cradle of the telephone set 76. When the detector 14a senses either of these conditions, it switches ON an internal transistor connected to pin 38 when an off-hook condition is present or will switch ON another internal transistor connected to pin 21 when a "ring" is present. These transistors are normally set at 5 volts d-c (high level) but are pulled down to near 0-volts (low level) when either transistor is switched ON.

The output of the detector 14a is a first signal that is applied through pin 38 and pin 21 to the signal inverter/conditioner circuit 16. Pin 38 and 21 are applied to pin 1 and 11 respectively of a hex schmitt trigger 16a. The trigger 16a senses the level change present at pin 38 and 21 of the detector 14a and inverts the "high" to "low" levels to "low" to "high" level. Once the signal has been inverted, it is inverted once again at pins 3, 4 and 9, 8 of the trigger 16a so that a second signal is produced that is at the proper level to trigger the timer/relay circuit 18.

The resistors 16b, 16c, 16d and 16e function to limit the current flow when there is a level change in the voltage. Capacitors 16f and 16g filter out any noise in the circuit. Diodes 16h and 16i are provided to protect the schmitt trigger circuit from any feedback current emanating from other circuit components.

The output of the signal inverter/conditioner circuit 16 is applied through the junction of diode 16h and resistor 16e to pin 2 of a timing IC 18a located at the input of the timer/relay circuit 18. The voltage level at output pin 3 of the timing IC 18a remains "high" until there is a level change at pin 4 and 8 of the schmitt trigger 16a. When the level changes from a "high" to a "low" state, the timer/relay circuit 18 starts. The length of the timing cycle is determined by resistor 18b and capacitor 18c. The output at pin 3 of the timing IC 18a is a timing signal that energizes a green LED 18d through resistor 18e and also energizes a single-pole single-throw relay 18f. The relay is maintained in the energized condition for a longer time period than the length of time set for the "ring pulse". Thus, the relay is kept from dropping out between "ring pulses". The combination of PNP transistor 18g and resistor 18h is used to continuously reset the timing cycle after each "ring pulse". This keeps the timing IC 18a from timing out between "ring pulses".

The transmitting circuit 20 in the preferred embodiment consists of an X10-BA284 transmitter 20a that is connected to a first utility 115 volt a-c power receptacle 80 via a power cable 20b. The contacts of the relay 18f are connected to the enabling contacts 20c of the transmitter 20a. Thus, when the relay 18f is energized, a transmitter enabling signal is produced that is applied across the contacts 20c of the X-10 transmitter 20a which causes the transmitter to turn ON. The transmitter then sends a coded signal through the utility power receptacle 80 and along the utility power lines to a corresponding X-10 receiver 42c that is located in the stereo/receiver unit 40 and that is likewise plugged into another utility power receptacle 80 elsewhere within a dwelling or other structure. The power line connection media allows the telephone/transmitter unit 12 to be operated remotely from any room within a dwelling or structure that has a standard utility power receptacle 80.

The power supply 22 as shown in FIGS. 3A and 3B provides the required power levels to operate the voltage sensing circuit 14, the signal inverter/conditioner circuit 16 and the timer/relay circuit 18. The power supply may consist of an a-c power adapter that plugs directly into a utility power receptacle 80 and that delivers the required d-c power levels; or the power supply may be located internally within the enclosure 30. Such an internal power supply, as shown in FIGS. 3A, 3B consists of three major elements: a step-down transformer 22d a bridge rectifier 22e and a voltage regulator 22g.

The utility power of 115 V a-c is applied from a utility power receptacle, via a power cable 22a, to a power switch 22b that allows the user to operate the telephone/transmitter unit 12. The voltage from the switch is applied through a fuse 22c before being reduced to 9-12 volts a-c by the step-down transformer 22d. This lower level goes through the bridge rectifier 22e which converts the a-c voltage to 9-12 volts d-c. A capacitor 22f filters the 9-12 V d-c and the voltage regulator 22g regulates the voltage to a constant 5 V d-c.

After the voltage passes through the voltage regulator 22g, capacitor 22h further filters out any high-frequency noise that may be present in the line. Additionally, a resistor 22i limits the current to the LED 22j which when illuminated, indicates that the power supply 22 is functioning.

STEREO/RECEIVER UNIT 40

Figure 5A:
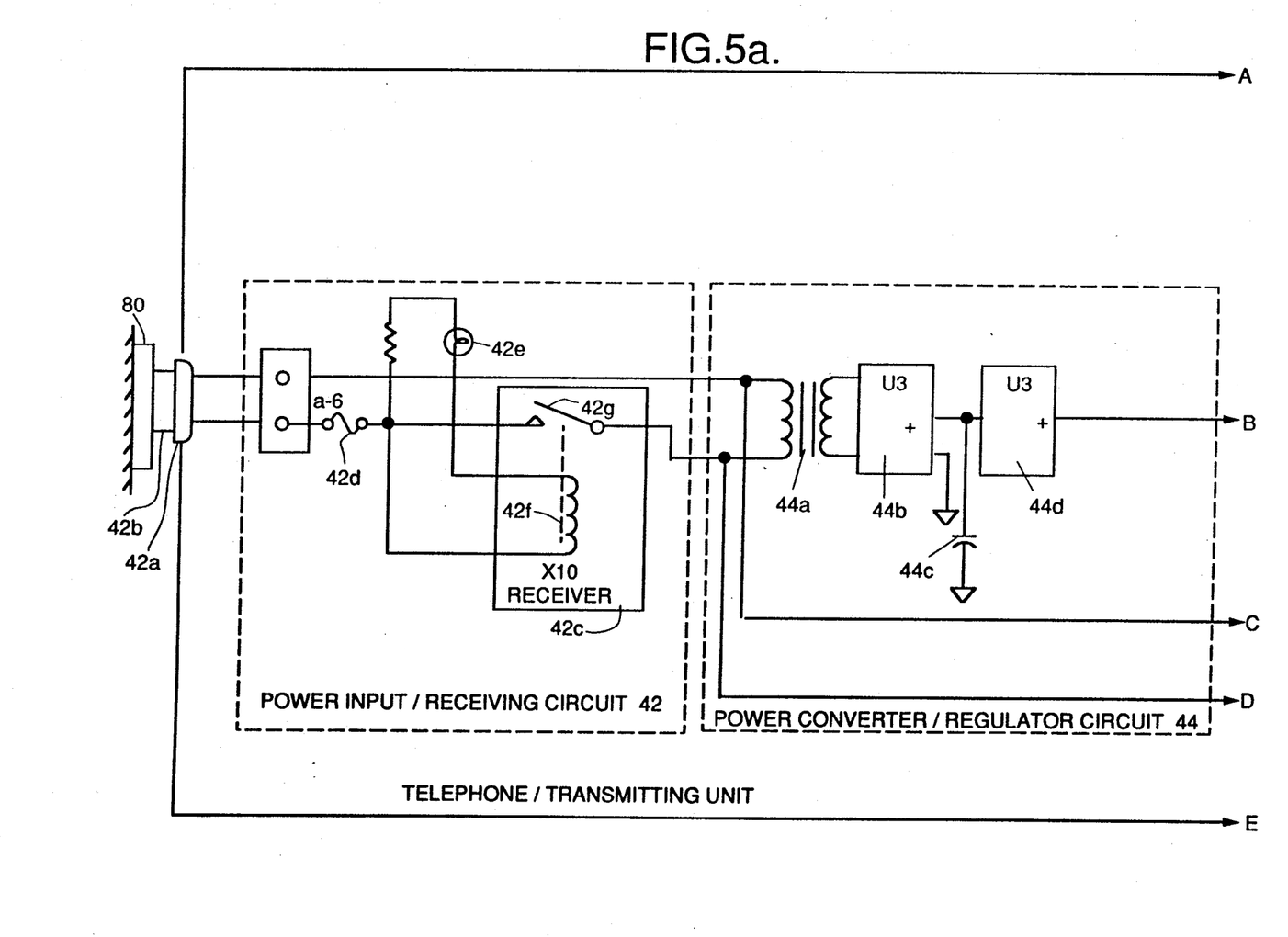
FIG. 5A is the first part of a schematic diagram illustrating the second embodiment of the stereo/receiver unit.
Figure 5B:
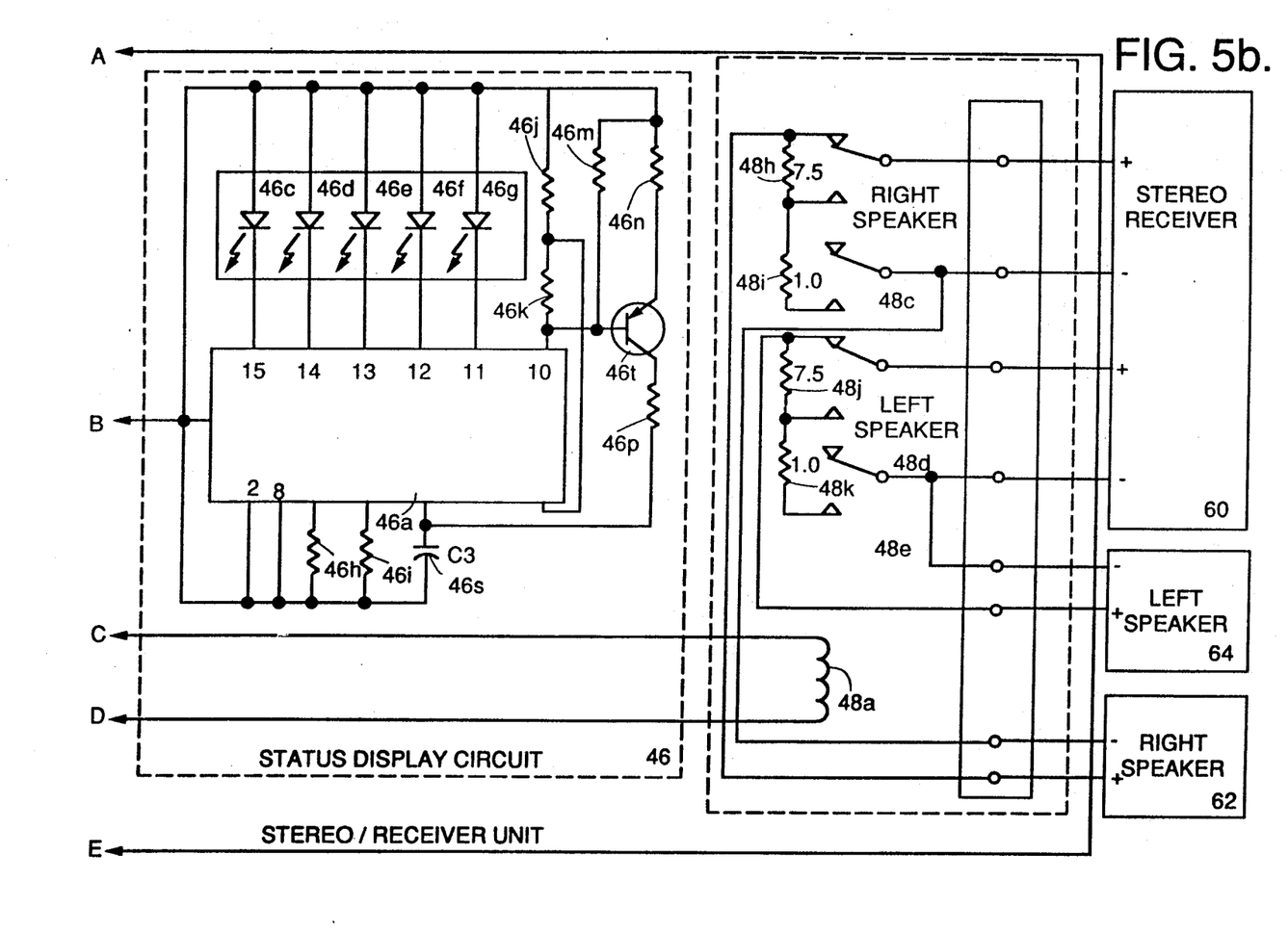
FIG. 5B is the second part of the schematic diagram illustrating the second embodiment of the stereo/receiver unit.

The input to the stereo/receiver unit 40, as shown in FIGS. 5A and 5B commences at the power input/-receiving circuit 42 when the power plug 42a of a power cable 42b is plugged into a second utility 115 volt a-c power receptacle 80. The utility power is applied to the receiver circuit which consists in the preferred embodiment of an X10-AM486 receiver 42c through a fuse 42d and a power ON indicator 42e. When the receiver 42c receives the coded signal from the telephone/transmitter unit 12 the X10 internal relay 42f is energized which closes the relay contact set 42g to produce a power signal.

Upon the closing of this relay, the power signal is applied to a step-down transformer 44a in the power converter/regulator circuit 44 and to speaker muting relay 48a located in the speaker muting circuit 48. The transformer 44a lowers the 115 volts a-c utility power to 9-12 volts a-c. This power is then rectified by a full wave rectifier 44b, filtered by capacitor 44c and regulated by regulator 44d to provide a constant 5 volts d-c.

The regulated 5 volt d-c power is used to enable an LM3914 integrated circuit 46a located in the status display circuit 46. The circuit 46a drives a display unit 46b consisting of five light emitting diodes (LED) 46c, 46d, 46e, 46f and 46g. These LED's are driven sequentially to indicated when the stereo/receiver unit 40 is either A) receiving an incoming call ("Ring") or B) when the telephone handset 78 has been lifted from the telephone set 76 cradle ("Off-Hook"). The B condition can occur when the telephone is answered or when the handset is lifted from its cradle to place a call. Resistors 46h, 46j, 46k, 46m, 46n, 46p and 46q in combination with capacitor 46s and PNP transistor 46t are used to set the speed and the sequential timing of the display 46b.

The final circuit in the stereo/receiver unit 40 is the speaker muting circuit 48 which causes the right and left stereo speakers 62, 64 connected to the stereo receiver 60 to become muted when the telephone rings or when the handset 78 of the telephone set 76 is lifted. The circuit, which is connected in series between the stereo receiver 60 and the speakers 62, 64 via a terminal strip 48m, is comprised of a four-pole double-throw relay 48a having a right-speaker contact pair 48b, 48c and a left-speaker contact pair 48d, 48e; and a right-speaker voltage divider network consisting of resistor 48h and 48i which are connected across the outer most contacts of the right speaker contact pair and a left-speaker voltage divider network consisting of resistors 48j and 48k which are connected across the outer most contacts of the left speaker contact pair as shown in FIGS. 5A, 5B.

When the stereo/receiver unit 40 is not receiving a coded signal from the X10 transmitter 20a located in the telephone/transmitter unit 12 the relay 48a is de-energized allowing the contact pairs to remain in their de-energized positions as shown in FIGS. 5A, 5B. When de-energized, the right and left speakers 62, 64 are connected directly through the respective contact pairs to the stereo receiver 60.

When a coded signal is received, indicating that the telephone is ringing or that the telephone handset 78 has been lifted, the X10 receiver is energized which causes the relay contact set 42g of relay 42f to close and thus apply the a-c power that then causes the muting circuit relay 48a to become energized. When so energized, the right and left speaker contact sets close causing the speaker output from the stereo receiver 60 to be applied through the left and right voltage dividers. The voltage dividers cause the audio signal to be attenuated by 20 db, which then allows the person using the telephone set to have a conversation without interference from the stereo system audio.

The second embodiment of the invention is similar in function to the preferred embodiment with the major exception that the X10 transmitter/receiver technology is replaced by a radio frequency transmitter and receiver.

Figure 6:
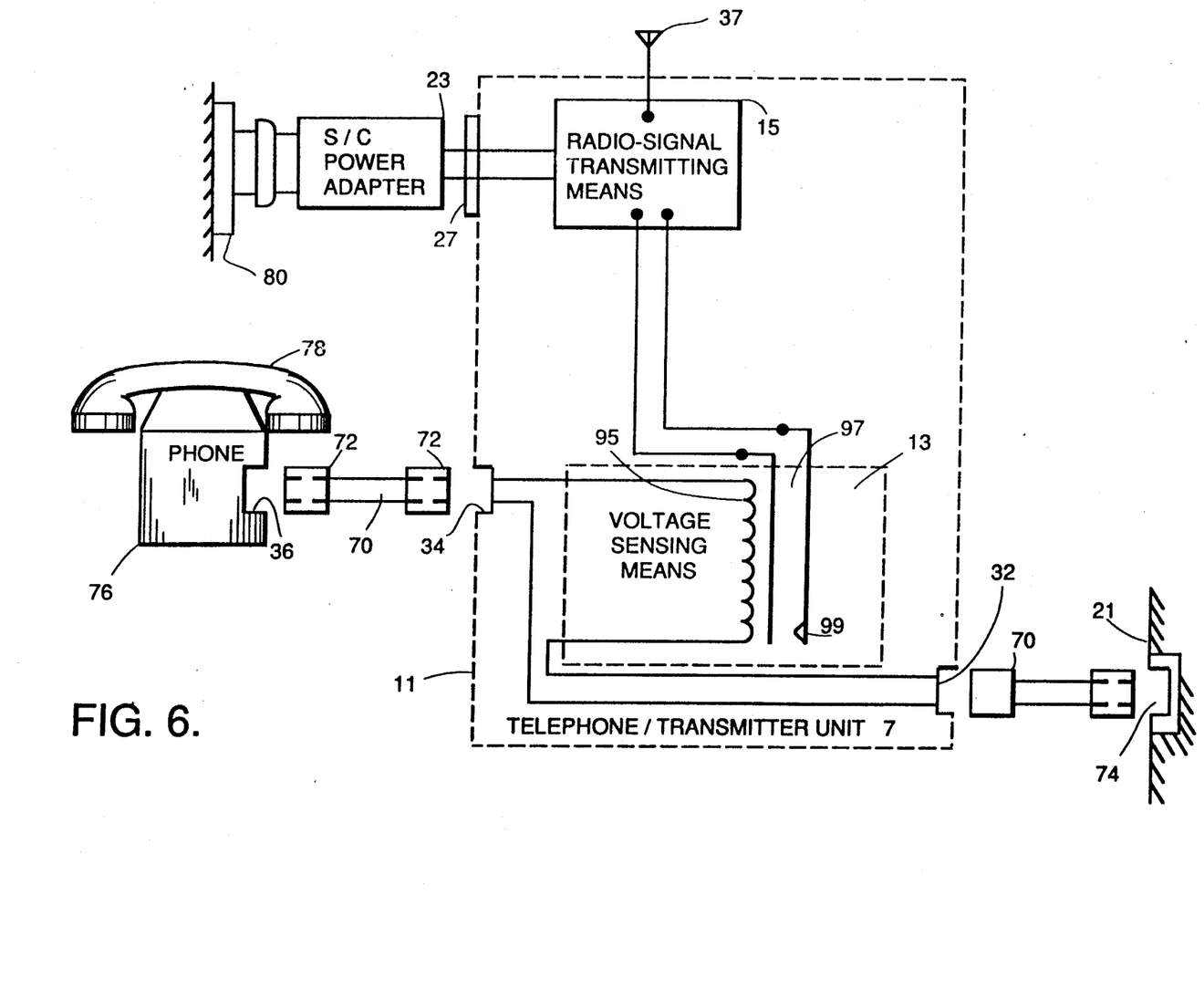
FIG. 6 is a block diagram illustrating the second embodiment of the telephone/transmitter unit.
Figure 7:
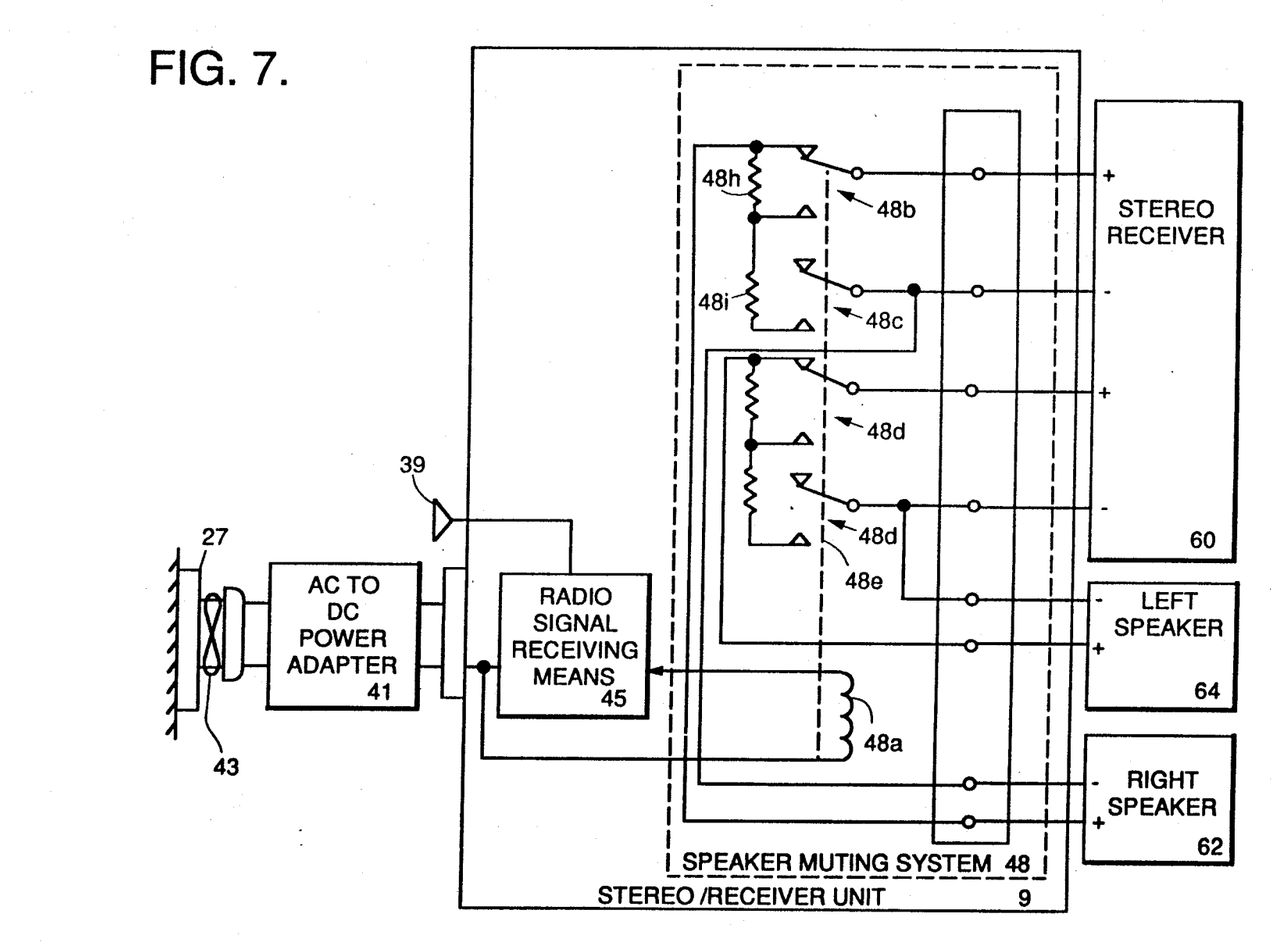
FIG. 7 is a block diagram illustrating the second embodiment of the stereo/receiver unit.

The second embodiment as shown in FIGS. 1, 6 and 7 is also comprised of two major elements, a telephone/-transmitter unit 7 and a stereo/receiver unit 9. These two units as shown in FIG. 1, function in combination with external elements consisting of a telephone set 76 and a stereo receiver 60 that includes a pair of speakers 62, 64. The telephone/transmitter unit 7 as shown in FIG. 6, consists of two major circuits: a voltage sensing means 13 and a radio signal transmitting means 15. Both circuits are housed within a portable enclosure 11 as shown in FIGS. 1 and 6.

The telephone/transmitter unit 7 incorporates a telephone line input jack 32 which may be an RJ11 type which is standard for telephone lines and makes for ease of installation in existing systems. The input jack 32 accommodates a standard telephone cable 70 which emanates from the telephone wall receptacle 74 from where it is routed to a telephone wall receptacle 74 from where it is further routed to the telephone central office (TCO). Alternatively, a wire (not shown) extending from the transmitter unit 7 can be incorporated and operatively associated with the telephone unit 7 to avoid the use of the input jack 32.

The transmitter unit 7 is powered by an AC to DC power adapter 23 which plugs into a standard utility AC power receptacle 80. The adapter converts the AC power to direct current power which is then applied via a power cable 25 to an electrical power connector 27 located on the transmitter unit 7 to supply the transmitting means 15 with the required power to operate the unit as described below. Alternatively, an internal power supply may be used or a battery supply may be incorporated to obviate the need to plug into an AC power source.

The voltage sensing means 13 receives its power from the changing voltage sensed within the phone line which is then applied through a cable 70 connected to receptacle 32. A small solenoid (not shown) sensing the voltage change produces the first signal which is sensed by the transmitting means 15.

The voltage sensing means 13 is connected between the telephone set 76 and a telephone wall receptacle 74 as shown in FIG. 6. The sensing means is designed to sense the decrease in voltage produced when the telephone handset 78 is lifted to answer a telephone call or the increase in voltage when the handset is hung up. The sensing means sends or stops sending a first signal to the radio signal transmitting means upon the sensing of the increase or decrease in voltage. The connection of the voltage sensing means to the telephone set 76 is made via a telephone cable 70 having a plug 72 which connects to the telephone set receptacle 34 on the telephone/transmitter unit 7 and a plug 72 which connects to a corresponding receptacle 36, on the telephone set 76. Both plugs are of the conventional RJ11 type. Alternatively, instead of the output receptacle 34, a telephone wire may be hardwired between the telephone/transmitter unit 7 and the telephone set 76. Although a conventional handset 78 is shown in conjunction with the standard telephone 76, the invention is not limited by the configuration as shown since the telephone set need only be interposed between the conventional telephone line 70 and the telephone set 76.

As previously stated, the basic design difference between the preferred and second embodiments is that in the second embodiment, the transmitting means 15 is comprised of a radio-frequency transmitter and the receiving means 45 of a corresponding radio-frequency receiver. The communication media in this design, is a radio signal that is linked by corresponding antennas 37,39. Both the transmitting means 15 and the receiving means 45 are of a type that are commonly known to those ordinarily skilled in the art of radio transmission and reception. Many types of frequencies and power output parameters may be chosen so long as they are in compliance with Federal Communication Commission (FCC) regulations and have sufficient power to allow the user of the invention to have sufficient range between the telephone set 76 and the stereo 60. One type of radio transmitter and receiver which has worked is a 49 MHz transmitter and receiver used in radio controlled toy race cars and boats. The design parameters can be determined by a person ordinarily skilled in the art to achieve an optimum result.

The antenna 37 of the transmitting means 15 extends beyond the housing 11 of the telephone unit 7. This allows a radio signal to be transmitted by the transmitting means 15 and to be received by the second antenna 39 located within or upon the stereo/receiver unit 9. Both antennae 37 and 39 can be a multisection universal handset type which are extendable to thirteen inches and retractable within the transmitter unit 7 and receiving unit 9, respectively.

The voltage sensing means 13 as shown in FIG. 6 includes a single-pole single-throw relay 95 which closes a set of contacts 97 when the relay 95 is energized by the sensing voltage which ranges between 5 and 10 volts. This voltage is found between the telephone line 70 and the telephone set 76 when the telephone handset 78 is lifted. When the relay becomes energized, the circuit between the transmitting means 15 and the power adapter 23 is closed.

When the telephone handset 78 is returned to its cradle on the telephone set 76 the voltage level returns to zero and the relay 95 de-energizes causing the contact set 97 to open which then disengages the transmitting means 15. Thus, stopping the transmission of the radio signal. Alternatively, an override switch (not shown) can be incorporated within the transmitting unit 7 to allow the stero 60 to operate while the telephone 78 is in use. The switch simply opens the circuit between the transmitting means 15 and the AO adaptor 23. Also, a plurality channel selector switch (not shown) can be incorporated into the circuitry of the transmitter unit 7 and the circuitry of the receiver unit 9. The corresponding channel selector switches can be present to operate on a variety of different channels to allow a number of different devices to operate within the same general area without interference between the telephone unit 7 and the stereo unit 9.

The stereo/receiver unit 9 as shown in FIG. 7 consists of two major circuits: a receiving means 45 and a speaker muting circuit 48 that includes a four-pole double-throw relay 48a. Each circuit is housed within a portable enclosure 49 as shown in FIGS. 1 and 7. The receiver unit may be powered by an internal power supply (not shown) or by an AO to DO power adapter 41 which is connected to a utility power receptacle 27 by means of a power cable 43 as shown in FIG. 1.

The speaker muting circuit 48 is identical to that of the preferred embodiment and is described again to continue the continuity of the second embodiment. The circuit 48 causes the right and left stereo speakers 62, 64 connected to the stereo receiver 60 to become muted when the handset 78 of the telephone set 76 is lifted. The circuit, which is connected in series between the stereo receiver 60 and the speakers 62, 64 via a terminal strip 48m, is comprised of a four-pole double-throw relay 48a having a right-speaker contact pair 48b, 48c and a left-speaker contact pair 48d, 48e; and a right-speaker voltage divider consisting of resistors 48h and 48i and a left-speaker voltage divider consisting of resistors 48j and 48k.

When the stereo/receiver unit 9 is not receiving a radio signal from the transmitting means 15 located in the telephone/transmitter unit 7 the relay 48a is de-energized allowing the contact pairs to remain in their de-energized positions as shown in FIG. 7. When de-energized, the right and left speakers 62, 64 are connected directly through the respective contact pairs to the stereo receiver 60.

When a radio signal is received, indicating that the telephone handset 78 has been lifted, the receiving means 45 is energized which produces a power signal that causes the muting circuit relay 48a to become energized. When 50 energized, the right and left speaker contact sets close causing the speaker output from the stereo receiver 60 to be applied through the left and right voltage dividers. The voltage dividers cause the audio signal to be attenuated by 20 db, which then allows the person using the telephone set to have a conversation without interference from the stereo system audio.

It should be appreciated from the foregoing description that the present invention provides an improved telephone operated stereo shut-off device 10, which is simple in construction, yet completely effective when interrupting a speaker from broadcasting a conventional radio transmission when the telephone handset is lifted off the telephone, as opposed to the listener having to move to another room location to turn down or turn off the stereo to answer the phone. The invention provides for greater ease of use and is completely adaptable with conventional telephones and stereos and obviates the need for using external wires to connect the telephone to the stereo. Most importantly, the invention is simple in construction incorporating materials that are relatively inexpensive to manufacture and assemble to achieve a flexible device providing all the benefits heretofore described.

Although the present invention has been described in detail with reference only to the presently preferred and second embodiment, it will be appreciated by those ordinarily skilled in the art that various modifications can be made without departing from the invention. For example, the voltage dividing network, in the speaker muting circuit 48, can be designed with different fixed resistor values and/or with variable resistors to provide the desired db muting level. Accordingly, the invention is limited only by the following claims.

I claim:

1. A telephone-operated stereo shut-off device that functions in combination with a telephone set and a stereo receiver operating at least a pair of speakers, said device comprising:
   A) a telephone/transmitter unit comprising:
      a) a voltage sensing circuit that is connected to the telephone central office and to the telephone set, where said voltage sensing circuit senses the power levels when either the telephone set rings or the handset is lifted from the telephone-set cradle and produces a first signal,
      b) a signal inverter/conditioner circuit that receives, inverts and conditions the first signal to produce a second signal,
      c) a timer/relay circuit that is activated upon receipt of the second signal and produces a timed signal when the telephone set is ringing or lifted off-hook, where the timed signal is used to energize a relay that when energized produces a transmitter enabling signal,
      d) a transmitting circuit that is connected to a first utility 115 volt a-c power receptacle and that is enabled upon the application of said transmitter enabling signal, where when enabled a coded signal is applied through and along the internal utility power lines,
      e) a power supply designed to provide the required power levels to operate the circuits of said telephone/transmitter unit,
   B) a stereo/receiver unit comprising:
      a) a power input/receiver circuit that is connected to a second utility 115 volt a-c power receptacle and that includes receiver means that is enabled when the coded signal from transmitter means is received via the internal utility power lines, when said enabled receiver produces an a-c power signal,
      b) a power converter/regulator circuit that receives and converts the a-c power signal to a constant d-c voltage,
      c) a status display circuit that is operated by the constant d-c voltage and that has the means to sequentially drive a display unit consisting of plurality of indicators that indicate when said stereo/receiver unit is either receiving an incoming call or when the telephone handset has been lifted from the cradle, and
      d) a speaker muting circuit connected between the stereo receiver and the speakers, where said muting circuit includes a voltage divider network and a relay that is energized by the power signal from said power input/receiver circuit, where when said relay is deenergized the speakers are connected directly to the stereo receiver and conversely, when the relay is energized, the speaker output from the stereo receiver is applied through said voltage divider network which causes the audio signal to be attenuated which then allows the person using the telephone set to have a conversation without interference from the stereo system audio.

2. The device as specified in claim 1 wherein said display unit located in said status display circuit consists of five light emitting diodes (LED).

3. The device as specified in claim 2 wherein the speed and sequential timing of said display is controlled by a set of resistors that operate in combination with a capacitor and a PNP transistor.

4. The device as specified in claim 1 wherein said speaker muting circuit comprises a four-pole double-throw relay having a right speaker contact pair and a left speaker contact pair where said right speaker voltage divider is connected across the outer most contacts of the right speaker contact pair and said left-speaker voltage divider is connected across the outer most contacts of the left speaker contact pair where said right and left voltage divider are in the circuit when said relay is energized.

5. The device as specified in claim 1 wherein said voltage sensing circuit further comprises a ring/off-hook detector circuit that is connected to the telephone central office and to the telephone set where said circuit senses the telephone "ring" voltage and current flow when the telephone handset is lifted from the telephone set cradle, where upon the occurrence of either event, a first signal is produced that is applied to said signal inverter/conditioner circuit.

6. The device as specified in claim 1 wherein said signal inverter/conditioner circuit further comprises a hex schmitt trigger that upon sensing the level change present at the output of said ring/off-hook detector circuit, inverts the signal and produces a second signal that is at the proper level to trigger said timer/relay circuit.

7. The device as specified in claim 6 wherein said signal inverter/conditioner circuit further comprises:
   a) a set of resistors to limit the current flow when there is a level change in the voltage,
   b) a pair of capacitors to filter any noise that may be present in said circuit, and
   c) a pair of diodes to protect said schmitt trigger circuit from any feedback current emanating from other circuit components.

8. The device as specified in claim 1 wherein said timer/relay circuit further comprises:

a) a timing integrated circuit that commences its timing cycle when the level at the output of said schmitt trigger changes from a "high" to a "low" state, where the length of the timing cycle is determined by a capacitor and resistor, and where at the end of the timing cycle a timing signal is produced, and b) a single-pole single-throw relay that is energized and remains energized for the length of the timing signal where said time is calculated to allow said relay to remain energized for a longer time period than the length of time set for the "ring pulse" to prevent said relay from dropping out between "ring pulses".

9. The device as specified in claim 1 wherein said transmitting circuit is comprised of said transmitter means that includes a set of contacts that when closed by the transmitter enabling signal from said relay, said transmitter means is enabled.

10. The device as specified in claim 1 wherein said receiver circuit of said power input/receiver circuit is comprised of said receiver means that incorporates an internal relay that when energized by the coded signal its contact set closes to allow the application of the 115 volt a-c power signal.

11. The device as specified in claim 1 wherein said power converter/regulator circuit further comprises a step-down transformer that lowers the 115 V a-c power signal to 9–12 volts a-c where the signal is further rectified by a full-wave rectifier and regulated to a constant 5 volt d-c by a regulator circuit.

* * * * *